United States Patent [19]

Knight et al.

[11] 4,190,389
[45] Feb. 26, 1980

[54] PROFILE MILLING MACHINE

[75] Inventors: Jerry W. Knight, Lewisville; Mervyn Woodward, Winston-Salem, both of N.C.

[73] Assignee: Westinghouse Electric Corp., Pittsburgh, Pa.

[21] Appl. No.: 908,045

[22] Filed: May 22, 1978

Related U.S. Application Data

[63] Continuation of Ser. No. 748,248, Dec. 6, 1976, abandoned.

[51] Int. Cl.² .............................................. B23C 1/18
[52] U.S. Cl. ................................... 409/120; 409/122; 51/101 R
[58] Field of Search ................... 90/13 A, 13.4, 13.7, 90/13.9; 51/232, 219 PC, 101 R, 50 PC

[56] References Cited

U.S. PATENT DOCUMENTS

| 2,178,441 | 10/1939 | Swanson | 90/13.4 |
| 2,656,651 | 10/1953 | Seyferth | 90/13.9 X |
| 2,720,141 | 10/1955 | Seyferth | 51/101 R X |

*Primary Examiner*—Gil Weidenfeld
*Attorney, Agent, or Firm*—F. J. Baehr, Jr.

[57] ABSTRACT

A plate cam and movable cam follower are disposed in a profile milling machine to reduce the costs of manufacturing the cam and improve the quality of the product.

8 Claims, 4 Drawing Figures

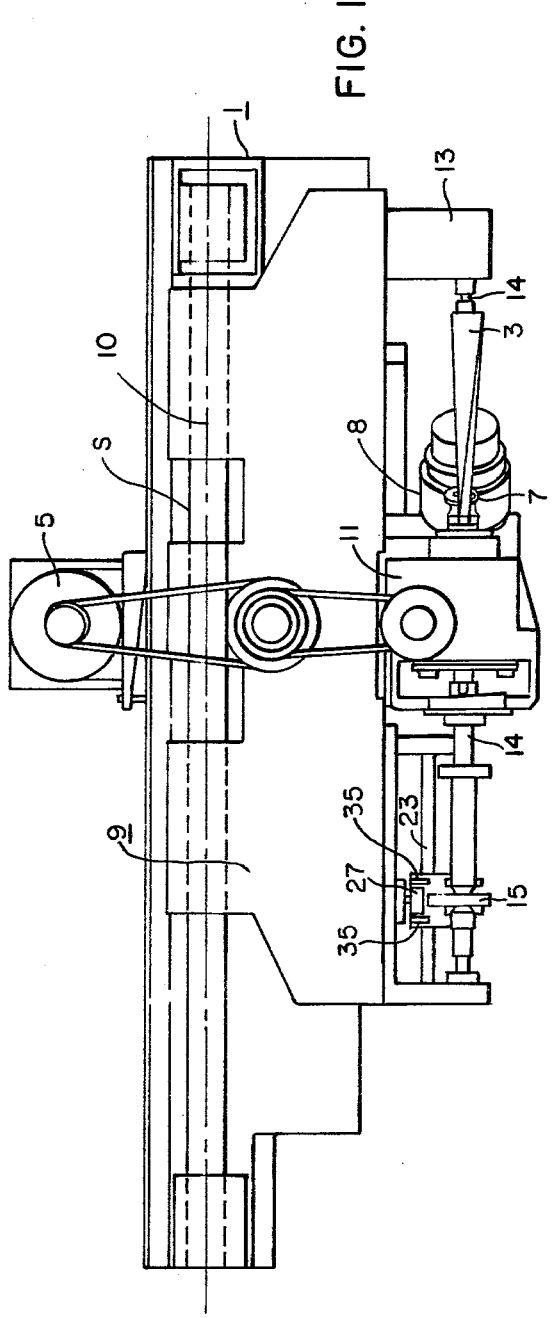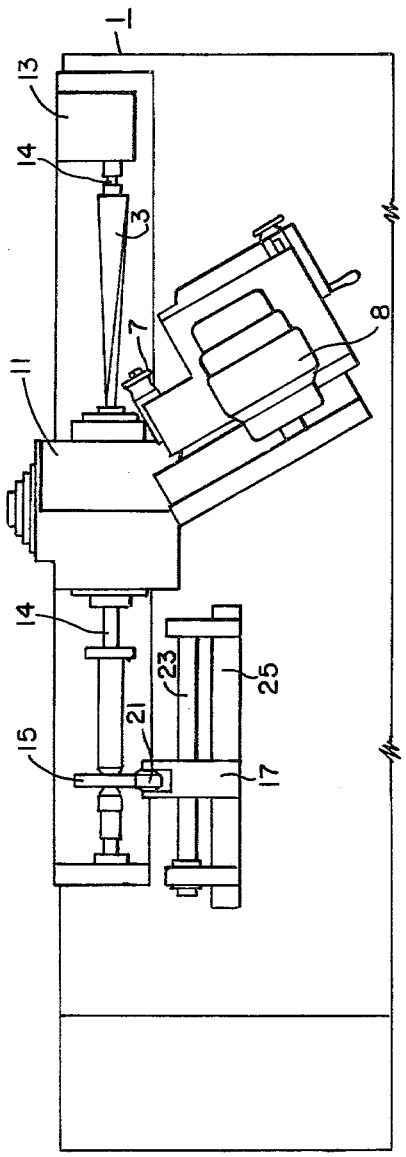

PROFILE MILLING MACHINE

This is a continuation of application Ser. No. 748,248 filed Dec 6, 1976, now abandoned.

BACKGROUND OF THE INVENTION

This invention relates to profile milling machines and more particularly to an improvement in a profile milling machine utilized to mill complete air foil forms.

Profile milling machines have been adapted to mill complete air foil forms for turbine blades by utilizing a long cam which moves in unison with a workpiece. The cams are expensive to manufacture and because of their length as it is difficult to obtain uniformity throughout their length. The turbine blade manufactured on such machines vary from blades to blade sufficiently that each blade is gauged, the measurements obtained are fed into a computer and the computer numbers the blades so that they could be arranged in a circular array in which a relatively uniform flow path through the array could be established by placing designated blades adjacent to each other.

SUMMARY OF THE INVENTION

In general, an improved profile producer operable to mill a complete air foil from a workpiece utilizing a mechanism which rotates, traverses, and pivotally oscillates the workpiece over a milling cutter to form the air foil, when made in accordance with the improvements described in this invention, comprises a plate cam disposed within the mechanism to rotate, traverse, and pivotally oscillate with the mechanism and a cam follower disposed to only move in unison with the traverse movement of the mechanism, whereby less expensive cams may be utilized to produce more uniform air foils.

BRIEF DESCRIPTION OF THE DRAWINGS

The objects and advantages of this invention will become more apparent from reading the following detailed description in connection with the accompanying drawings, in which corresponding reference characters indicate corresponding portions throughout the drawings and in which:

FIG. 1 is a plan view of a profile producing machine incorporating the improvements described in this invention;

FIG. 2 is a elevational view of a profile producing machine incorporating the improvements described in this invention;

DESCRIPTION OF THE PREFERRED EMBODIMENT

Figure 3:
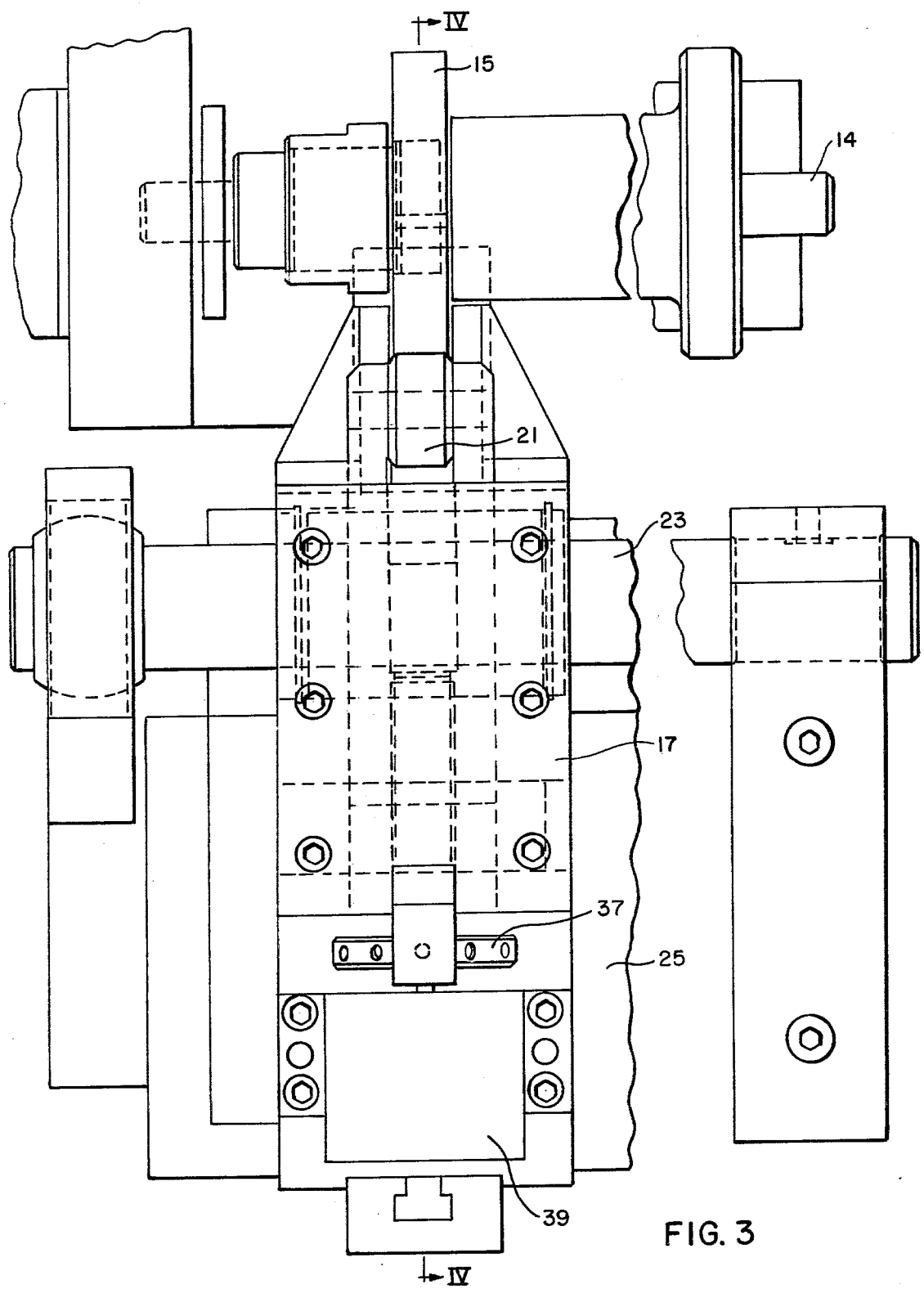
FIG. 3 is an enlarged partial elevational view of the improvements described in this invention.

Referring now to the drawings in detail and in particular to FIGS. 1 and 2, there is shown a precision profile producing, milling machine 1 for milling, grinding or otherwise machining a complete air foil form from a workpiece 3 such as style 186 milling machine manufactured by the Ex-Cell-O Corporation, Post Office Box 386, Detroit, Mich. and described in the U.S. Pat. No. 2,656,651 which is herein incorporated by reference. The milling machine 1 is hydraulically and electrically operated to machine an air foil shaped turbine blade including the leading and trailing edges from a workpiece 3 by raising and lowering the workpiece 3 as the workpiece 3 is rotated and maintained in cutting engagement with a milling cutter 7. A two-speed drive motor 5 rotates the workpiece 3 at high speeds when the milling cutter 7 rotated by a cutter drive motor 8 engages the edges of the blade or workpiece where the area of contact between the cutter 7 and workpiece 3 is small. The two-speed drive motor 5 slows down when the cutter 7 contacts the side of the blades or workpiece where the area of contact between the cutter and the workpiece 3 is large. Thus, two different cutting speeds are utilized twice during each revolution of the workpiece to produce a uniform finish on the workpiece 3.

The milling machine 1 comprises a longitudinal shaft S disposed in the upper portion of the machine 1 and a mechanism 9 which is pivotally and slidable disposed on the shaft S. The mechanism 9 has means disposed therein which rotates the workpiece 3, causes it to traverse the milling cutter 7 and also pivotally oscillates the workpiece 3 through a predetermined arc. The mechanism 9 has a pivotal axis 10, which is coincident with the axis of the shaft S, and the workpiece 3 is so disposed between a head stock 11, which is driven by the two-speed drive motor 5, and a tail stock 13 to have its axis of rotation generally parallel to the pivotal axis 10 of the mechanism 9. The head stock 11 also drives a shaft 14 on which is disposed a plate cam 15. The shaft 14 and plate cam 15 are disposed on the same axis of rotation as the workpiece 3. The cam 15 is so disposed in the mechanism 9 that it moves in unison with the rotational, traversal, and pivotal oscillatory movement of the workpiece 3 and mechanism 9. The cam 15 cooperates with a cam follower assembly 17 and the pivotal axis 10 of the mechanism 9 to cause the mechanism 9 and the workpiece 3 to pivotally oscillate in the predetermined arc.

Figure 4:
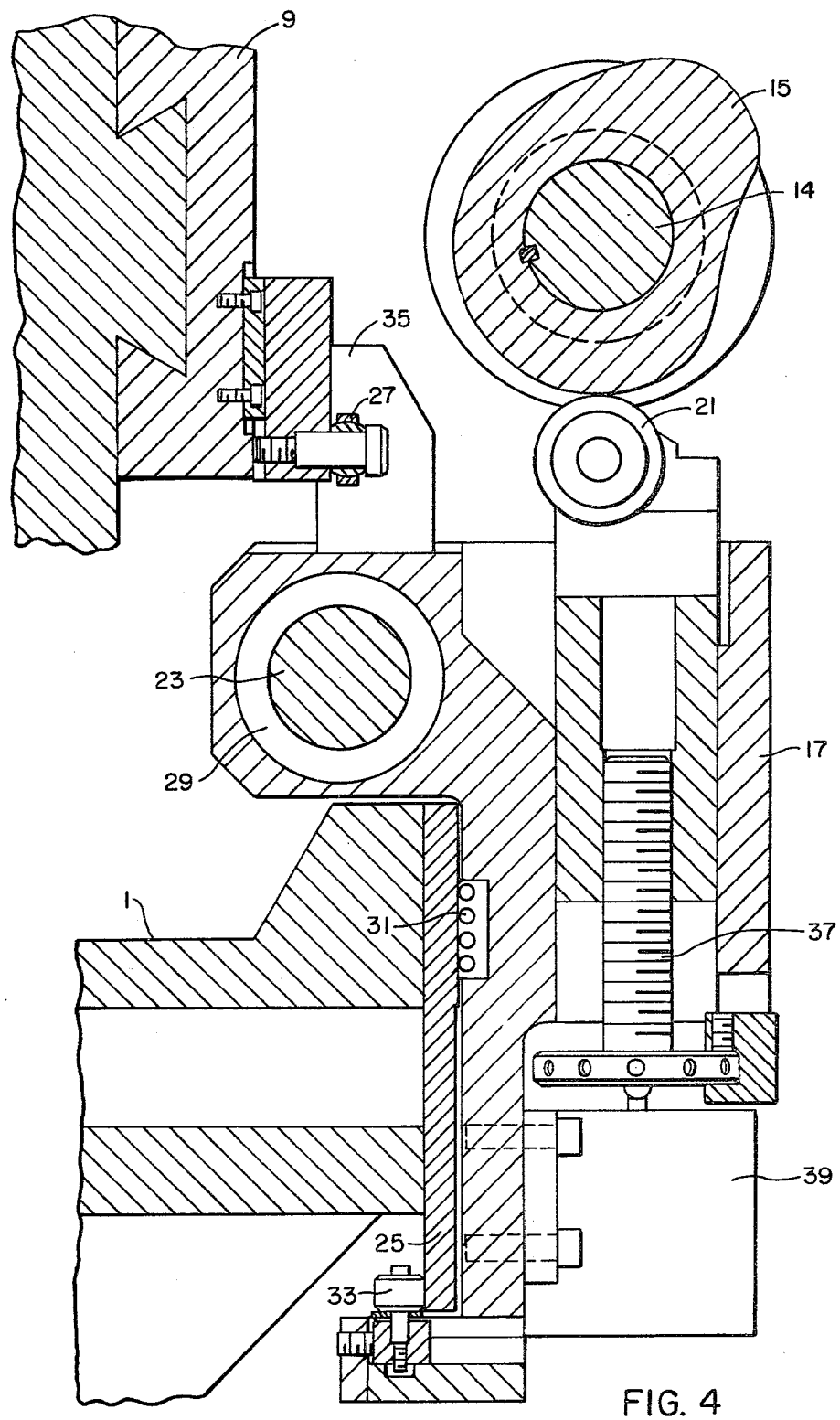
FIG. 4 is an enlarged sectional view taken on line IV—IV of FIG. 3.

The cam follower assembly 17, as shown best in FIGS. 3 and 4, comprises a cam follower 21 rotatably mounted in the cam follower assembly 17 and disposed in contact with the cam surface on the cam 15. The cam follower assembly 17 further comprises a guide bar 23, wear plate 25, and a rotatable mounted bearing 27 cooperatively associated with the cam follower 21 to allow the cam follower 21 to move rectilinearly in unison with the traversing movement of the mechanism 9 and workpiece 3.

The guide bar 23 is so disposed that its axis is generally parallel to the pivotal axis 10 of the mechanism 9 and a ball bushing 29 is disposed in the cam follower assembly 17 to provide smooth sliding engagement between the guide bar 23 and the cam follower assembly 17. A ball way gib 31 is disposed in the cam follower assembly 17 along with a second cam follower assembly 33 to provide free sliding movement between the cam follower 17 and the wear plate 25, which is attached to the machine 1. The ball way gib 31 and the cam follower 33 are disposed on opposite sides of the wear plate to prevent rotary movement of the cam follower assembly with respect to the guide bar 23. The rotatable bearing 27 is generally a spherical bearing and is disposed on the mechanism 9 so as to fit between a pair of ears 35, which provide parallel flat surfaces extending from the cam follower assembly 17 so that as the rotatable bearing 27 engages the parallel flat surfaces of the ears 35, the mechanism 9 transmits only the transversing movement thereof to the cam follower assembly 17 with a minimum of rubbing action, whereby the cam follower 21 only moves in unison with the traversing movement of the mechanism 9 and workpiece 3.

An adjusting screw or other adjusting means 37 is disposed in the cam assembly 17 for setting the extremes of the pivotally oscillation of the workpiece 3 with respect to the milling cutter 7 by raising or lowering the cam follower and changing the position of the workpiece 3 with respect to the cutter 7 to compensate for wear on the cutter 7 as to accommodate different size cutters 7.

A hydraulic ram or other actuating means 39 is also disposed in the cam follower assembly 17 to raise the cam follower 21, to move the cam 15 upwardly, and to lift the workpiece 3 off the milling cutter 7 for, raising the workpiece 3 with respect to the milling cutter 7, and moving the workpiece out of engagement with the cutter to allow free manual movement of the workpiece 3.

The plate cam 15 and movable cam follower 21 replace a stationary cam follower and a long cam which was more difficult and expensive to manufacture. While it was obvious that the new plate cam and movable cam 15 follower 21 would make replacement cams easier and less expensive to manufacture, the new plate cam and movable cam 15 follower 21 resulted in an unexpected and unforeseeable improvement in the quality of the air foils. Heretofore, to produce an array of air foils with uniform passages between adjacent blades it was necessary to gauge each air foil and assemble them in particular arrangements relative to each other utilizing an averaging process performed by a computer. Upon gauging the blades manufactured with the new cam 15 and cam follower 21, described hereinbefore, the uniformity of the blades was such, that within the limits previously set for selecting blades, the computer program showed that the blades were interchangeable. Therefore the improvement described herein, produces a uniform air foil, which results in uniform arrays and an improvement in the performance of turbines assembled with blades manufactured by the improved profile milling machine described herein.

What is claimed is:

1. An improved profile producing machine operable to machine a complete air foil from a workpiece utilizing a mechanism having means for rotating, traversing, and pivotally oscillating the workpiece over a milling cutter to form the air foil, the improvement comprising a plate cam disposed within said means for rotating, traversing and pivotally oscillating the workpiece to move in unison therewith and to impart the pivotally oscillating movement thereto; a cam follower disposed to engage said cam; and means for moving said cam follower in unison with the traversing movement of said means for rotating, traversing and pivotally oscillating the workpiece during the milling operation, whereby less expensive cams may be utilized to produce more uniform air foils.

2. An improved profile producing machine as set forth in claim 1, wherein the means for rotating, traversing and pivotally oscillating the workpiece has a shaft about which it pivotally oscillates, and the means for moving the cam follower comprises a guide bar disposed parallel to the shaft, the cam follower being slidably disposed relative to the guide bar.

3. An improved profile producing machine as set forth in claim 2, wherein the means for moving the cam follower further comprises a ball bushing slidably disposed on the guide bar and attached to the cam follower.

4. An improved profile producing machine as set forth in claim 1, wherein the means for rotating, traversing and pivotally oscillating the workpiece has a shaft about which it pivotally oscillates and the means for moving the cam follower comprises a wear plate disposed parallel to the shaft, and wherein the cam follower is cooperatively attached to bearings in contact with opposite sides of the wear plate and the cam follower is slidably disposed relative to the wear plate.

5. An improved profile producing machine as set forth in claim 2, wherein the means for moving the cam follower further comprises a wear plate disposed parallel to the shaft and the cam follower in cooperatively attached to bearings in contact with opposite sides of the wear plate and the cam follower is slidably disposed with respect to the wear plate.

6. An improved profile producing machine as set forth in claim 5, wherein the means for moving the cam follower further comprises a rotatably mounted bearing disposed on the means for rotating, traversing and pivotally oscillating the workpiece and disposed between parallel ears cooperatively attached to the cam follower to transmit only the transversing movement of the means for rotating, traversing and pivotally oscillating the workpiece to the cam follower.

7. An improved profile producing machine as set forth in claim 1, wherein the means for moving the cam follower further comprises a rotatably mounted bearing disposed on the means for rotating, traversing and pivotally oscillating the workpiece and disposed between parallel ears cooperatively connected to the cam follower to transmit to the cam follower only the transverse movement of the means for rotating, traversing and pivotally oscillating the workpiece.

8. An improved profile producing machine as set forth in claim 1 and further comprising an actuating means cooperatively associated with the cam follower for raising the cam follower to disengage the workpiece and the milling cutter.

* * * * *